United States Patent [19]

Mersiovsky et al.

[11] Patent Number: 4,839,857

[45] Date of Patent: Jun. 13, 1989

[54] SYSTEM FOR FACILITATING THE CONTROL OF AUDIO INFORMATION WITHIN A WORD PROCESSING DOCUMENT WITH AUDIO INPUT

[75] Inventors: Linda K. Mersiovsky; Charles N. Sprott, both of Austin, Tex.; Jonathan W. Oelrich, Austin, Tex.; Cecil W. Rogers, Sr., Georgetown, Tex.

[73] Assignee: IBM Corporation, Armonk, N.Y.

[21] Appl. No.: 873,755

[22] Filed: Jun. 13, 1986

[51] Int. Cl.[4] .................. G06F 1/00; G11B 19/00; H04R 29/00
[52] U.S. Cl. .......................... 369/25; 369/50; 381/56; 364/900; 364/926; 364/952; 364/952.4; 364/952.5; 364/943; 364/943.43; 364/948.2
[58] Field of Search ... 364/200 MS File, 900 MS File; 369/25; 381/56, 58, 104, 108, 109

[56] References Cited

U.S. PATENT DOCUMENTS

| 3,614,336 | 10/1971 | Patey | 369/25 |
|---|---|---|---|
| 4,219,702 | 8/1980 | Smith, Jr. | 369/25 |
| 4,390,834 | 6/1983 | Ohsita | 381/109 |
| 4,424,575 | 1/1984 | Clarke et al. | 364/900 |
| 4,472,833 | 9/1984 | Turrell et al. | 381/56 |
| 4,549,098 | 10/1985 | Fushiki | 381/109 |
| 4,712,093 | 12/1987 | Reichel et al. | 381/56 |

OTHER PUBLICATIONS

Nicholson, R. T., "Integrating Voice in the Office World", Byte, Dec. 1983, pp. 177–184.

Primary Examiner—Eddie P. Chan
Assistant Examiner—Rebecca L. Rudolph
Attorney, Agent, or Firm—Skjerven, Morrill, MacPherson, Franklin & Friel

[57] ABSTRACT

A word processing system in which text can be displayed on a display device and audio recording and playback means is provided to permit a user to record an audio message includes means for monitoring the volume level of speaking by the user and means for notifying the user if the volume level of the speaking by the user is too high or too low. Also, the system allows the user to pause and resume during recording and playback without requiring re-recording or re-playback of the entire message.

4 Claims, 3 Drawing Sheets

SYSTEM FOR FACILITATING THE CONTROL OF AUDIO INFORMATION WITHIN A WORD PROCESSING DOCUMENT WITH AUDIO INPUT

CROSS-REFERENCE TO RELATED APPLICATION

Application Ser. No. 873,752, filed June 13, 1986, now abandoned, and assigned to the same assignee as the present application, discloses a word processing system in which a visual and/or audible indication is provided to the operator of the system to signal that there exists one or more audio messages relative to a particular portion of text being displayed at that time on the system.

BACKGROUND OF THE INVENTION

1. Field of the Invention

This invention relates to the use of audio input in connection with a word processing system.

2. In the Prior Art

In word processing systems, such as the IBM DisplayWrite 3, it is desirable to provide some means for a system user or operator to insert instructions or messages relative to text being processed by the system. U.S. Pat. No. 4,582,441 discloses a system for providing voice prompting to a keyboard operator indicating particular information to be entered by the operator. This system employs a voice synthesizer which can synthesize predetermined words in accordance with digital encoding techniques, and these synthesized commands are played back at the desired time to prompt the keyboard or display operator. Further, U.S. Pat. No. 4,215,422 discloses an example of phrase storage capabilities in a typewriter.

One particularly useful technique allows the use of audio input from the user to issue instructions, usually in relation to text being displayed on a display device in the system. In such a system, it is desirable that the user have the ability to record an audio message in the system and that this recorded audio message be played back in audio output form by the user or another person.

One problem which can occur on such an audio system is that if the operator is speaking too softly into the microphone while recording, the speech may not be picked up properly by the microphone. This will result in the message being lost in the recording. On the other hand, if speaking too loudly, the message may not come out clearly on the recording because of overloading one or more elements of the audio system. In either case, the message will not be of useful quality, and if this occurs, the operator must re-record the entire message again until they can adjust their voice to the right volume level.

Another problem encountered in such a system is that if the operator is interrupted while recording a message, such as by a telephone call or the like, they must stop and leave the recording only partially finished. Thus, the operator must again select the record function and completely re-record the message. The same problem occurs while listening to a previously recorded message: if the operator wishes to jot down a note or the like, they will probably miss part of the message while they are writing. Under these circumstances, they must again go through the process of selecting the listen function, and listen to the entire recording again.

SUMMARY OF THE PRESENT INVENTION

In accordance with one feature of the present invention, while the operator is recording a message if their voice gets too soft for an accurate recording to be made, a message will appear on the display instructing the operator to speak more loudly. Also, if the spoken volume is too loud for an accurate recording to be made, a message will appear on the display instructing the operator to speak more softly.

This volume indicator function may be implemented by checking the status of the audio driver unit after listening for noise. If the driver indicates that the volume was too high or too low, the user is informed of this and instructed to change their volume through a message on the screen. While the operator is playing a message back, they are able to control the volume by using the cursor "up" key to raise the volume and the cursor "down" key to lower the volume. The instructional menu displayed while the operator is playing the message informs them that they are able to do this. The system operating code requests the operator's input for the cursor up or down to be actuated while playback is in progress, and if it is, the volume change request is passed to the audio driver.

Another feature of the invention gives the operator the ability to pause for an indefinite period of time while recording an audio message, simply by actuating the keyboard space bar. This allows time to regroup their thoughts, to be interrupted by a telephone call, etc., without having to stop recording the audio message and start over again when they decide to continue it. When they are ready to continue the recording, the operator simply actuates the space bar and continues talking and the partial messages will be combined into one complete message. The operator may pause as many times as they desire during one recording session.

The operator may also pause during playback of an audio message. The space bar may be used as many times as desired to stop the playing of the message until the space bar is actuated again, at which time the playing of the message will resume exactly where it left off before it was stopped by actuation of the space bar.

This function may be implemented by displaying a menu instructing the operator to actuate the space bar to pause immediately after the record/playback begins. When the operator actuates the space bar, the audio access control program issues a STOP command to the audio driver. When the space bar is actuated again, the audio access control program issues a START command to the audio driver and the function is resumed.

DETAILED DESCRIPTION OF THE PREFERRED EMBODIMENT

The present invention is particularly adapted for use with a word processing system known as the IBM DisplayWrite 3. Such a system includes a personal computer like the IBM PC-AT or PC-XT, including a keyboard and display device, and operating software for the system. Additionally, to carry out the present invention, the system requires a Voice Communications Adaptor and it must have the IBM Voice Communications Operating Subsystem program which is an application program interface program which is loaded and made resident in the system before the DisplayWrite 3 program is executed.

Figure 1:
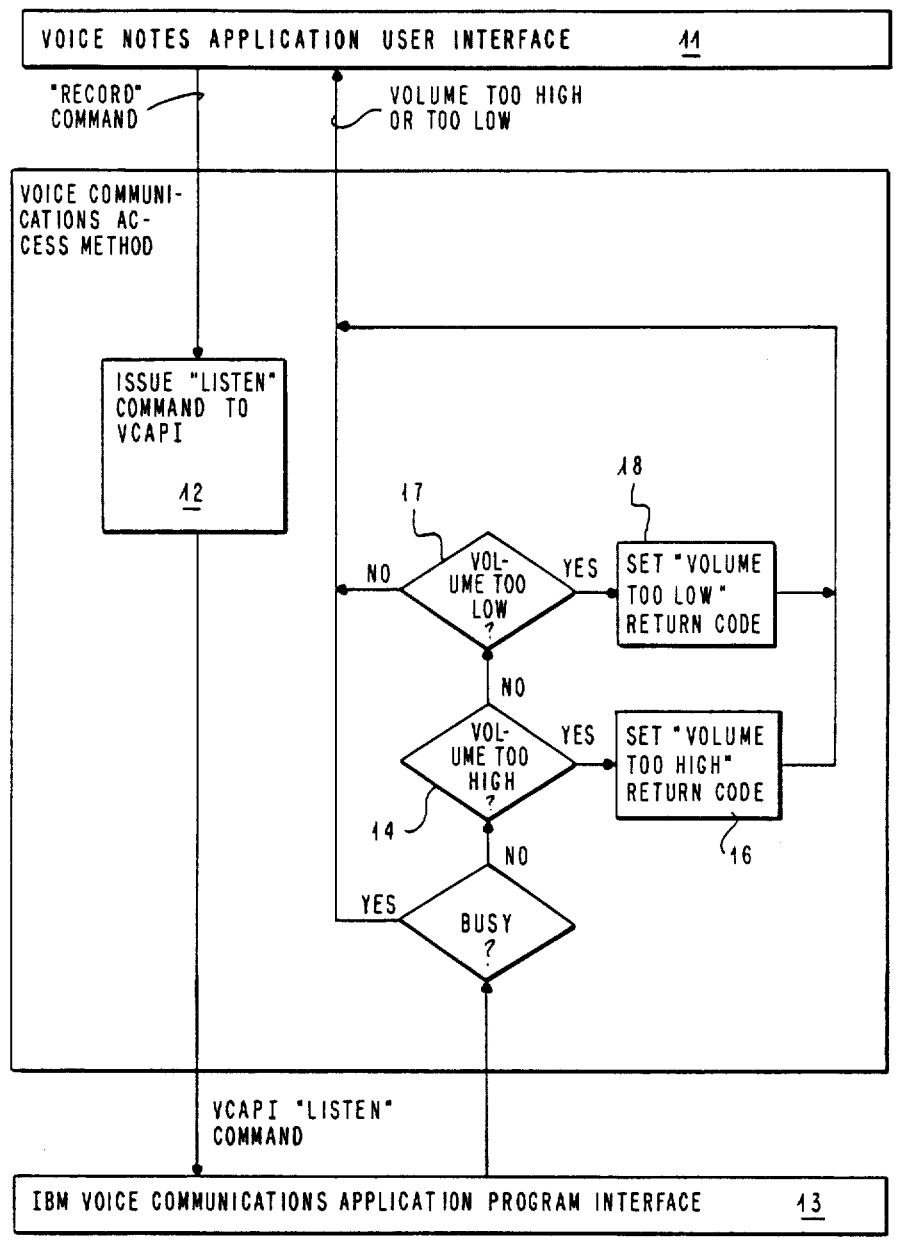
FIGS. 1 and 2 are flow charts illustrating the operation of the volume monitoring feature of the present invention during record and playback, respectively.

The flow chart of FIG. 1 illustrates the operation of the system to monitor the voice level of the operator during recording of an audio message for use in the system. An audio message is identified as a voice note in the DisplayWrite 3. Recording is initiated through a voice notes application user interface 11 (VNAUI) which processes a "RECORD" command generated by the system operator. Through DisplayWrite 3 programming identified as Voice Communications Access Method (VCAM), the record command, represented by 12, is converted to a "listen" command which is passed to the voice communications application program interface 13 (VCAPI) of the DisplayWrite 3. This causes the system to continuously monitor the signal level in the audio driver of the recording circuitry. A portion of this monitoring is represented by element 14 showing the monitoring for excessively high recording volume level. If the recording level is too high, a code indicating "volume too high" is returned to the VNAUI through element 16. This code causes the appearance on the display screen of a message indicating to the operator that they are speaking too loudly and that they should reduce their voice level. This message remains on the display as long as the voice recording is too high, but will disappear from the screen when the voice level returns to an acceptable level.

Block 17 represents the monitoring of the audio driver to detect a recording voice level which is too low. If the volume is too low, block 18 causes the generation and transmission to the VNAUI of a code indicating the low volume. This results in the appearance on the display screen of a message advising the operator that the voice level being recorded is too low, and this message will remain on the screen as long as the recorded voice level is too low.

Figure 2:
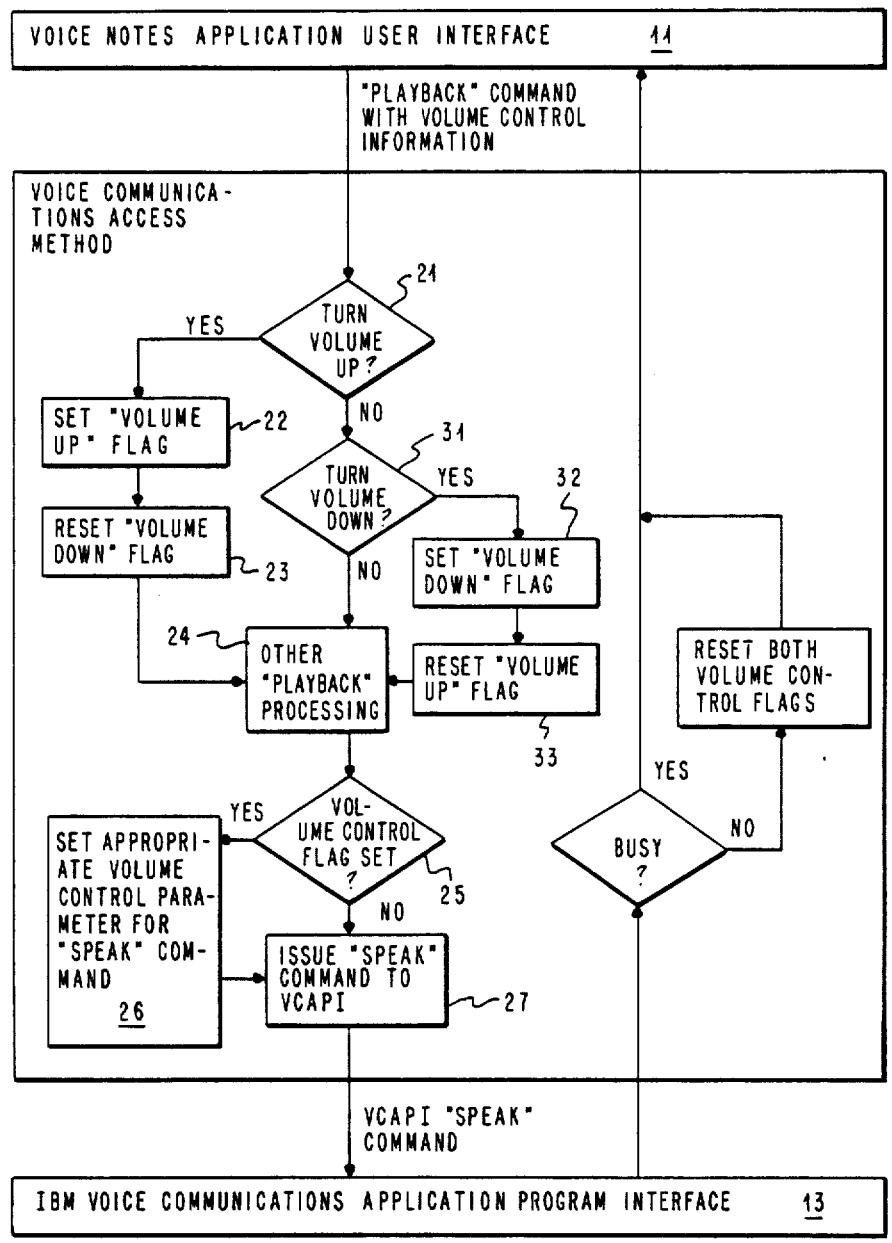

The flow chart of FIG. 2 illustrates the basic operation for the present invention when operating in the playback mode to play back an audio message previously recorded by the operator during which the volume of recording may have been either too high or too low, as discussed above in connection with FIG. 1. The "playback" command is issued through VNAUI 11. If the user requests that the volume should be turned up because the message was recorded at a too low volume, element 21 causes a "volume up" flag in element down flag through element 2. After other playback processing in block 24, the volume control flag set condition is examined in element 25 and if the flag is set, element 26 sets the appropriate volume control parameter for the "speak" command to be issued by the VCAPI. Block 27 causes the issuance of the "speak" command to the VCAPI, which in turn causes the previously recorded audio material to be played back through a speaker in the word processing system.

During playback of the previously recorded messages, in those passages where the recorded volume is either too low or too high, the VNAUI causes an instruction to appear on the screen of the display device, preferably in the form of a message in the menu area, allowing the operator to either turn up or turn down the playback volume. In one particularly attractive form of the invention, the instruction to the operator allows them to raise or lower, respectively, the volume of the recording being played back by pressing the cursor keys.

A similar mode of operation occurs when the volume control should be turned down, as detected by block 31 in FIG. 2. This causes the setting of a "volume down" flag, as shown by element 32, which, after resetting the "volume up" flag in element 33 and the other playback processing in element 24, is supplied to check the set condition of the volume control flag in element 25. This information is passed through element 26 to element 27 to cause the issuance of the "speak" command to the VCAPI. As with a low volume condition described above, the "speak" command will cause the VCAPI to play back the recorded message with an indication on the display screen to the operator that the volume in the recorded message may be decreased. Again, this message may be in the form of a menu instruction advising the operator to actuate the screen cursor key to reduce the volume of the message being played back.

Figure 3:
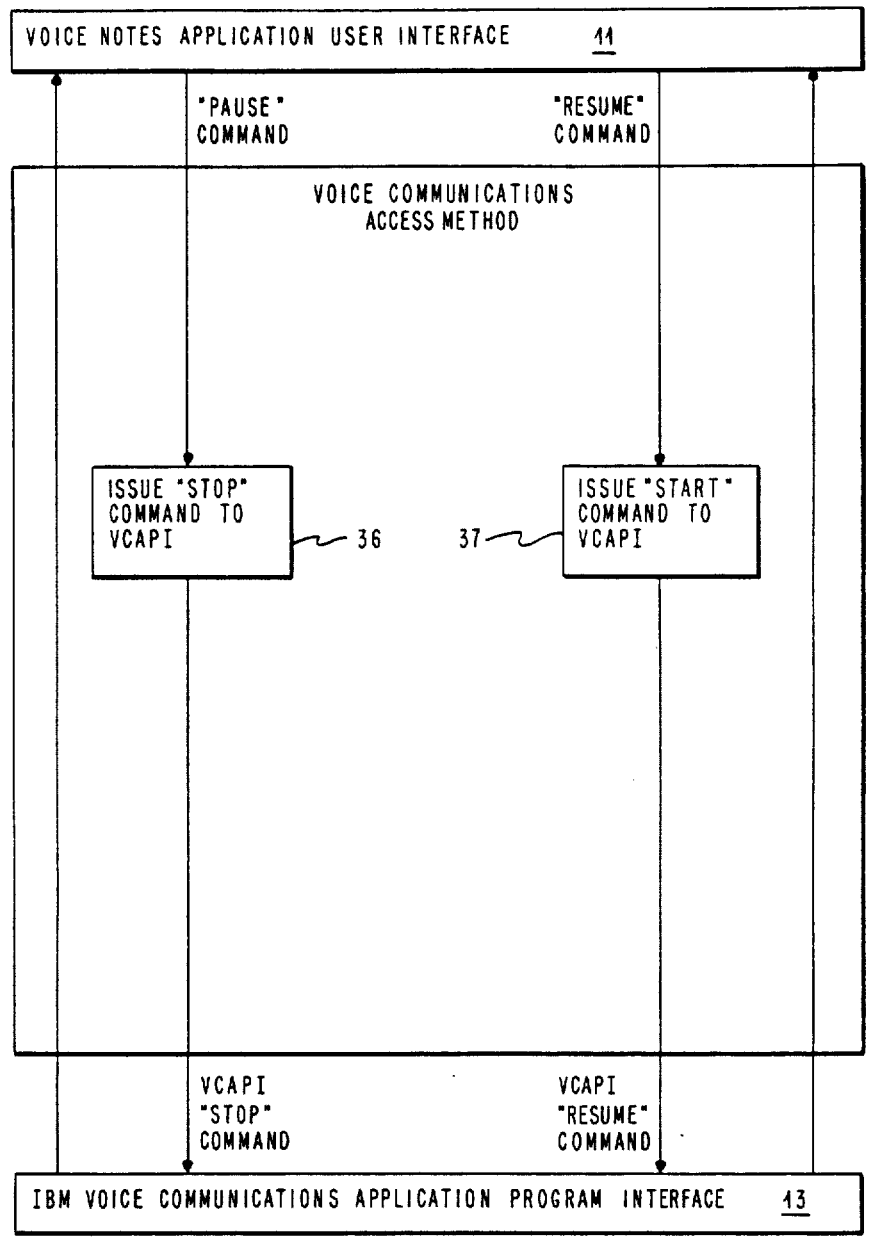
FIG. 3 is a flow chart showing the operation of the pause/resume feature of the invention.

FIG. 3 illustrates the operation of the present invention to permit pausing during recording and the resumption of that recording. To pause during recording, the operator makes a suitable input, such as actuating the space bar on the keyboard. This information is converted by the VNAUI to a "pause" command which is transmitted through the voice communications access method to result in the issuance of a "stop" command to the VCAPI, represented by element 36 in FIG. 3. This "stop" command to the VCAPI results in stopping of the recording process.

When the operator wishes to resume the recording or playback, they may again actuate the space bar on the keyboard to generate a "resume" command. This is converted in the Voice Communications Access Method to cause the generation of the "start" command in element 37 to the VCAPI, resulting in the resumption of either playback or recording. Thus, this feature of the present invention permits pausing during either recording or playback of audio messages, without requiring that the entire message be either re-recorded or played back again to maintain continuity, as would otherwise be required without this feature.

We claim:

1. A word processing system in which text can be displayed on a display device comprising:
   audio recording and playback means for recording and playing back information spoken by a user of said system, said spoken information indicating changes to be made in said displayed text;
   means for monitoring the volume level of said information spoken by said user;
   means for notifying said user if said volume level of said information spoken by said user is too high or too low during recording of said spoken information;
   means for playing back the audio information spoken by said user;
   means for monitoring the volume level at which said played back information was recorded;
   said means for notifying indicating to the user during playing back of said spoken audio information whether to increase or decrease the volume level of said played back information in order to compensate for a too low or too high volume level during recording of the spoken information;
   said notifying means including means for presenting an indication on said display device adjacent to said displayed text; and said word processing system including input means, under user control, said indication on said display device instructing said user to actuate said input means to raise or lower the volume level during recording or playing back of said audio information.

2. A system in accordance with claim 1 in which said indication allows said user to actuate said cursor key to raise or lower the volume level of said played back message.

3. A system in accordance with claim 1 in which said indication appears in a menu on said display device.

4. A system in accordance with claim 1 including means operable by said user for stopping and resuming either the recording or the playing back of said spoken information.

* * * * *